United States Patent
Rentsch et al.

(10) Patent No.: US 9,376,542 B2
(45) Date of Patent: Jun. 28, 2016

(54) HIGH SOLIDS AND LOW VISCOUS AQUEOUS SLURRIES OF CALCIUM CARBONATE-COMPRISING MATERIALS WITH IMPROVED RHEOLOGICAL STABILITY UNDER INCREASED TEMPERATURE

(71) Applicant: Omya International AG, Oftringen (CH)

(72) Inventors: Samuel Rentsch, Aarburg (CH); Matthias Buri, Rothrist (CH); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 14/407,620

(22) PCT Filed: Jul. 10, 2013

(86) PCT No.: PCT/EP2013/064537
§ 371 (c)(1),
(2) Date: Dec. 12, 2014

(87) PCT Pub. No.: WO2014/009396
PCT Pub. Date: Jan. 16, 2014

(65) Prior Publication Data
US 2015/0141551 A1    May 21, 2015

Related U.S. Application Data

(60) Provisional application No. 61/673,811, filed on Jul. 20, 2012.

(30) Foreign Application Priority Data

Jul. 13, 2012 (EP) .................................. 12176392

(51) Int. Cl.
*C08K 3/26* (2006.01)
*D21H 17/69* (2006.01)
(Continued)

(52) U.S. Cl.
CPC ................. *C08K 3/26* (2013.01); *C01F 11/185* (2013.01); *C04B 14/28* (2013.01); *C09C 1/021* (2013.01);
(Continued)

(58) Field of Classification Search
None
See application file for complete search history.

(56) References Cited

U.S. PATENT DOCUMENTS

| | | |
|---|---|---|
| 5,171,409 A | 12/1992 | Barnier et al. |
| 6,387,176 B1 | 5/2002 | Widmer et al. |

(Continued)

FOREIGN PATENT DOCUMENTS

| | | |
|---|---|---|
| EP | 0380430 A1 | 8/1990 |
| EP | 0542634 A1 | 5/1993 |

(Continued)

OTHER PUBLICATIONS

The International Search Report, dated Jan. 28, 2014 for PCT Application No. PCT/EP2013/064537.
(Continued)

*Primary Examiner* — Satya Sastri
(74) *Attorney, Agent, or Firm* — Amster, Rothstein & Ebenstein LLP

(57) ABSTRACT

The present invention concerns aqueous slurries with improved rheo logical stability under increased temperature. The slurries comprise a calcium carbonate containing material and at least one comb polymer.

44 Claims, 1 Drawing Sheet

Specific viscosity of the polymers A to D as a function of the temperature

(51) Int. Cl.
*D21H 19/14* (2006.01)
*D21H 19/38* (2006.01)
*D21H 19/42* (2006.01)
*D21H 19/44* (2006.01)
*D21H 21/14* (2006.01)
*C09C 1/02* (2006.01)
*C01F 11/18* (2006.01)
*C04B 14/28* (2006.01)
*C09D 7/12* (2006.01)
*D21H 17/33* (2006.01)
*D21H 17/67* (2006.01)

(52) U.S. Cl.
CPC .............. *C09D 7/1216* (2013.01); *D21H 17/33* (2013.01); *D21H 17/675* (2013.01); *D21H 17/69* (2013.01); *D21H 19/14* (2013.01); *D21H 19/38* (2013.01); *D21H 19/385* (2013.01); *D21H 19/42* (2013.01); *D21H 19/44* (2013.01); *D21H 21/14* (2013.01); *C01P 2004/51* (2013.01); *C01P 2004/61* (2013.01); *C01P 2004/62* (2013.01); *C01P 2006/12* (2013.01); *C01P 2006/22* (2013.01); *C01P 2006/40* (2013.01); *C08K 2003/265* (2013.01)

(56) References Cited

U.S. PATENT DOCUMENTS

| | | |
|---|---|---|
| 6,777,517 B1 | 8/2004 | Albrecht et al. |
| 8,536,292 B2 * | 9/2013 | Mongoin .............. C08F 265/00 524/424 |
| 9,056,932 B2 * | 6/2015 | Dupont ................. C08F 220/06 |
| 2005/0256225 A1 | 11/2005 | Viola |
| 2006/0009560 A1 | 1/2006 | Gane et al. |
| 2007/0299183 A1 | 12/2007 | Gane et al. |
| 2009/0145987 A1 | 6/2009 | Gane et al. |
| 2009/0199741 A1 | 8/2009 | Bleibler et al. |
| 2010/0025507 A1 * | 2/2010 | Buri ...................... C01F 11/185 241/15 |
| 2011/0031652 A1 | 2/2011 | Fisher et al. |

FOREIGN PATENT DOCUMENTS

| | | | |
|---|---|---|---|
| EP | 0736553 A2 | 10/1996 | |
| EP | 1136508 A1 | 9/2001 | |
| EP | 1138697 A1 | 10/2001 | |
| IT | WO 2010106022 A1 * | 9/2010 | ............. C08G 18/10 |
| WO | 0077058 A1 | 12/2000 | |
| WO | 2004041882 A1 | 5/2004 | |
| WO | 2004041883 A1 | 5/2004 | |
| WO | 2005111160 A1 | 11/2005 | |
| WO | 2010018432 A1 | 2/2010 | |
| WO | 2011028817 A1 | 3/2011 | |

OTHER PUBLICATIONS

The Written Opinion of the International Searching Authority, dated Jan. 28, 2014 for PCT Application No. PCT/EP2013/064537.

* cited by examiner

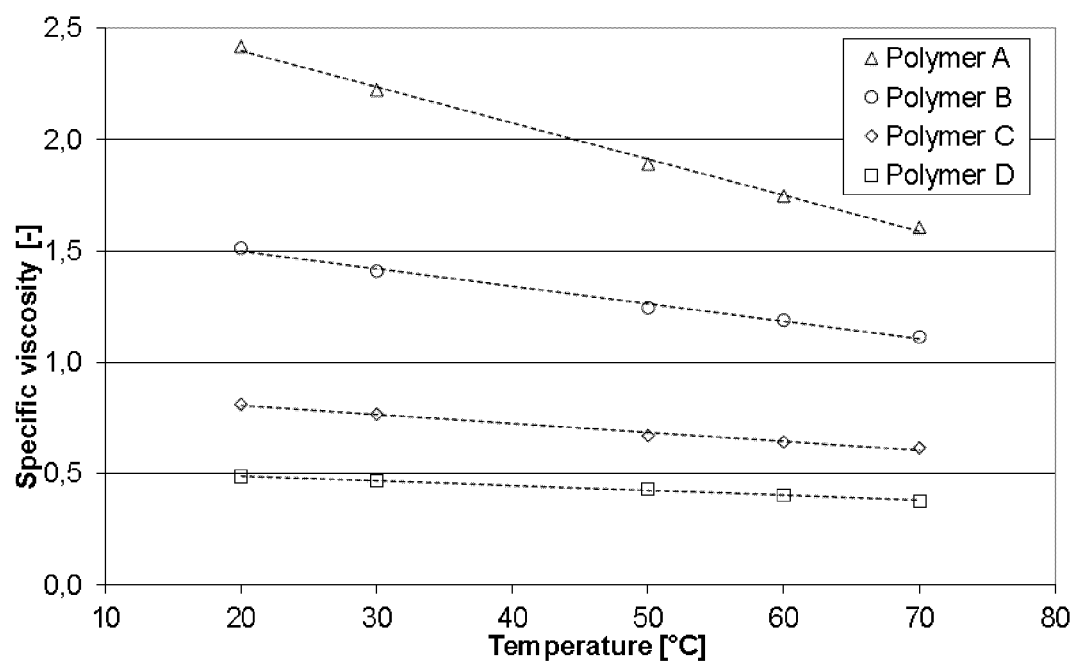
Specific viscosity of the polymers A to D as a function of the temperature

HIGH SOLIDS AND LOW VISCOUS AQUEOUS SLURRIES OF CALCIUM CARBONATE-COMPRISING MATERIALS WITH IMPROVED RHEOLOGICAL STABILITY UNDER INCREASED TEMPERATURE

CROSS-REFERENCE TO RELATED APPLICATIONS

This application is a U.S. national phase of PCT Application No. PCT/EP2013/064537, filed Jul. 10, 2013, which claims priority to European Application No. 12176392.4, filed Jul. 13, 2012 and U.S. Provisional Application No. 61/673,811, filed Jul. 20, 2012.

The present invention relates to aqueous slurries of calcium carbonate containing material, and more specifically to aqueous slurries with improved rheological stability under increased temperature comprising a calcium carbonate containing material and at least one comb polymer.

Freshly ground, non-dispersed, calcium carbonate has a weakly positive charged surface and a pH value of about 8 to 9. However, in the preparation of aqueous slurries of calcium carbonate containing materials, the skilled person is often required to select and introduce additives in order to regulate one or more characteristics of these slurries. For example, high solid content, low viscosity slurries can only be processed if a corresponding dispersant is added. In making the additive selection, the skilled person must bear in mind that this additive should be cost efficient and should not lead to unwanted interactions or effects downstream during the transportation, processing and application of the slurries.

The addition of a dispersant such as a sodium polyacrylate or sodium polyphosphate inter alia affects the surface charge of the calcium carbonate particles in the slurry in that it generates negative charges on the particles. This effect can be used to separate the solid particles from the slurry as described in U.S. Pat. No. 5,171,409 A1. Furthermore this effect is also described, for example, in EP 0 542 643 A1 and EP 0 380 430 A1.

However, such dispersed calcium carbonate comprising slurries can cause troubles during their later applications, such as paper making or paper coating. In paper making, the expert is faced with the problem of retention of the filler in the paper web during paper making. The high anionic charge on the surface of the pigment particles, dispersed using sodium polyacrylate, may cause problems fixing these particles on the anionic wood or cellulous fibres. Therefore, it is necessary to neutralize the particles by adding cationic additives, but, however, without flocking cellulosic fibres at the same time, which may result in worse paper formation, for example, unevenness and cloudiness of the formed paper.

This problem is getting worse with increasing solid content of a calcium carbonate comprising slurry, and is especially pronounced in calcium carbonate comprising slurries with a high solid content, i.e. slurries having a solid content of more than 45 wt.-% based on the total weight of the slurry. The higher the solids content in the slurry, the higher the dispersant demand to reach viscosity values in the slurry, which are suitable for the further use and production, which in turn leads to a high anionic charge on the particle surface. In paper coating it is known by a skilled person that high solids calcium carbonate containing slurries with high ionic charge bear the risk of flocculation in presence of polymeric binder, also known as depletion flocculation. As a result the flocculated coating colour is losing binding force and gloss.

One possibility known in the art to control and overcome such problems of highly charged particle surface is described in WO 2004/041882 A1 and WO 2004/041883 A1 disclosing weakly ionic aqueous slurries of ground mineral matter such as calcium carbonate using comb polymers. Furthermore, a process to prepare precipitated calcium carbonate implementing low charge acrylate or maleinate containing comb polymers is described in WO 2010/018432 A1.

Using such comb polymers to stabilize the viscosity of high solids calcium carbonate containing slurries, the expert is still faced with the problem of the lack of rheo logical stability under increased temperature of these slurries. Since the industry today is required to produce calcium carbonate containing material industrially by milling and dispersing, the slurry gets very hot due to shear induced energy by grinders and dispersers. The temperatures can get far above 65° C., e.g. between 70° C. and 105° C. Furthermore, it is possible that the slurries have to be heated up before or during storage, for example, to sterilize the slurries, or that the slurries reach high temperatures during subsequent processing. Depending on the circumstances the slurries may reach temperatures of 65° C. or more. At such temperatures, the viscosity can increase dramatically. However, if the additives used to control the viscosity during production deteriorate at this temperature, the machines get blocked and there is a high risk of damaging production units, such as grinding units. In this case the product has continuously to be cooled to overcome the blocking and damaging of equipment or production capacity has to be reduced. This is very energy intensive and costly. Furthermore, if the additives used to stabilize the aqueous slurries deteriorate at high temperatures, the particles may flocculate, resulting in the so called depletion flocculation.

Therefore, there is a need for improved additives that control, reduce, or prevent the viscosity increase of slurries comprising calcium carbonate comprising material at elevated temperatures, e.g. at temperatures above 65° C. Furthermore, it would be desirable to provide additives that stabilize the high solids calcium carbonate containing material aqueous slurries at elevated temperatures.

Furthermore, it would be desirable to provide an additive which does not affect the other physical properties of the slurry, such as the electrical conductivity and the surface charge of the particle surface in an unacceptable way. It would also be desirable to provide an aqueous slurry of a calcium carbonate containing material, which is fluid, and thus, can contain a very high amount of calcium carbonate solids, even at higher temperatures.

Surprisingly it was found that the foregoing and other objectives are solved by the use of at least one comb polymer in an aqueous slurry comprising a calcium carbonate containing material, wherein the specific viscosity of the at least one comb polymer measured at 20° C. at a polymer concentration of 45 g/l differs from the specific viscosity of said polymer measured at 70° C. at the same polymer concentration by a specific viscosity difference $\Delta\eta_{sp}$, wherein the absolute value of $\Delta\eta_{sp}$ is from 0.15 to 0.5, the at least one comb polymer does not have a cloud point between 20° C. and 95° C. measured in water, and the at least one comb polymer has a specific charge from −10 C/g to −600 C/g at pH 8.

The inventors surprisingly found that the use of the at least one comb polymer having a combination of the above mentioned 3 characteristics (a specific viscosity difference $\Delta\eta_{sp}$, no cloud point in a defined temperature range and a specific charge in a defined range) is especially advantageous to provide aqueous calcium carbonate containing slurries with improved rheological stability under increased temperature.

The comb polymers with the aforementioned characteristics can reduce the heat sensitivity of such a slurry and such can prevent unwanted viscosity increase of the slurry during production and application at elevated temperatures, e.g. at temperatures of above 65° C.

According to one aspect of the present invention, an aqueous slurry with improved rheological stability under increased temperature is provided comprising
  a calcium carbonate containing material, and
  at least one comb polymer,
    wherein the specific viscosity of the at least one comb polymer measured at 20° C. at a polymer concentration of 45 g/l differs from the specific viscosity of said polymer measured at 70° C. by a specific viscosity difference $\Delta\eta_{sp}$, wherein the absolute value of $\Delta\eta_{sp}$ is from 0.15 to 0.5,
    the at least one comb polymer does not have a cloud point between 20° C. and 95° C. measured in water, and
    the at least one comb polymer has a specific charge from −10 C/g to −600 C/g at pH 8, and
    wherein the viscosity of the aqueous slurry is between 25 and 1000 mPa·s measured at 20° C. and at 90° C.

According to another aspect of the present invention, a method for producing an aqueous slurry with improved rheological stability under increased temperature is provided comprising the steps of,
  a) providing a calcium carbonate containing material,
  b) providing water,
  c) providing at least one comb polymer,
    wherein the specific viscosity of the at least one comb polymer measured at 20° C. at a polymer concentration of 45 g/l differs from the specific viscosity of said polymer measured at 70° C. by a specific viscosity difference $\Delta\eta_{sp}$, wherein the absolute value of $\Delta\eta_{sp}$ is from 0.15 to 0.5,
    the at least one comb polymer does not have a cloud point between 20° C. and 95° C. measured in water, and
    the at least one comb polymer has a specific charge from −10 C/g to −600 C/g at pH 8,
  d) mixing the calcium carbonate containing material of step a) with the water of step b),
  e) mixing the at least one comb polymer of step c) with the calcium carbonate containing material before and/or during and/or after step d),
    wherein the at least one comb polymer is added in an amount, such that the viscosity of the aqueous slurry is between 25 and 1000 mPa·s measured at 20° C. and at 90° C.

According to still another aspect of the present invention, a method for producing composite particles is provided comprising the steps a) to e) of the inventive method for producing an aqueous slurry with improved rheological stability under increased temperature and a further step f) of drying the obtained slurry. The composite particles produced by this method show reduced heat sensitivity when redispersed in water.

According to still another aspect of the present invention, composite particles obtainable by the inventive method for their production are provided.

According to still another aspect of the present invention, the use of the inventive aqueous slurry in paper, plastics, paint, coatings, concrete and/or agriculture applications is provided, wherein preferably the aqueous slurry is used in wet end process of a paper machine, in cigarette paper, board, and/or coating applications, or as a support for rotogravure and/or offset and/or ink jet printing and/or continuous ink jet printing and/or flexography and/or electrophotography and/or decoration surfaces, or the aqueous slurry is used to reduce sun light and UV exposure of plant leaves.

According to still another aspect of the present invention, the use of the inventive composite particles in paper, plastics, paint, coatings, concrete and/or agriculture applications is provided, wherein preferably the composite particles are used in wet end process of a paper machine, in cigarette paper, board, and/or coating applications, or as a support for rotogravure and/or offset and/or ink jet printing and/or continuous ink jet printing and/or flexography and/or electrophotography and/or decoration surfaces, or the composite particles are used to reduce sun light and UV exposure of plant leaves.

Advantageous embodiments of the present invention are defined in the corresponding sub-claims.

According to one embodiment the amount of calcium carbonate in the calcium carbonate containing material is at least 80 wt.-%, preferably at least 95 wt.-%, more preferably between 97 and 100 wt.-%, and most preferably between 98.5 and 99.95 wt.-%, based on the total weight of the calcium carbonate containing material.

According to another embodiment the calcium carbonate containing material has a weight median particle size $d_{50}$ from 0.1 to 100 µm, preferably from 0.25 to 50 µm, more preferably from 0.3 to 5 µm, and most preferably from 0.4 to 3.0 µm. According to another embodiment the calcium carbonate containing material is a ground calcium carbonate (GCC), a precipitated calcium carbonate (PCC), or a mixture thereof.

According to another embodiment the aqueous slurry has a solid content from 45 to 82 wt.-%, preferably from 60 to 78 wt.-%, and more preferably from 70 to 78 wt.-%, based on the total weight of the aqueous slurry. According to another embodiment the aqueous slurry has a pH from 7 to 12, preferably from 7.5 to 11, and more preferably from 8.5 to 10.

According to another embodiment the at least one comb polymer has a specific charge from −10 C/g to −500 C/g at pH 8, preferably from −10 C/g to −300 C/g at pH 8, and more preferably from −10 C/g to −100 C/g at pH 8. According to another embodiment the at least one comb polymer has an intrinsic viscosity of between 5 and 100 ml/g, preferably between 7 and 80 ml/g, and most preferably between 8 and 20 ml/g. According to another embodiment the at least one comb polymer does not have a cloud point between 25° C. and 90° C., and preferably does not have a cloud point between 30° C. and 85° C.

According to another embodiment the at least one comb polymer is present in an amount from 0.01 to 10 wt.-%, based on the total weight of the solids in the slurry, preferably from 0.05 to 5 wt.-%, more preferably from 0.1 to 3.0 wt.-%, even more preferably from 0.2 to 2.0 wt.-%, and most preferably from 0.25 to 1.5 wt.-% or from 0.5 to 1.25 wt.-%. According to another embodiment the at least one comb polymer is present in an amount such that the obtained aqueous slurry has a viscosity between 25 and 800 mPa·s measured at 20° C. and at 90° C., preferably between 30 to 500 mPa·s measured at 20° C. and at 90° C., and most preferably between 35 to 300 mPa·s measured at 20° C. and at 90° C.

According to another embodiment the aqueous slurry does not contain an additive having a specific charge of more than −500 C/g at pH 8. According to another embodiment the viscosity of the aqueous slurry at 40° C. is equal or higher than the viscosity at 90° C. According to another embodiment the aqueous slurry has an improved rheological stability under increased temperature for at least 30 min, preferably for at least 1 h, more preferably for at least 12 h, even more preferably for at least 24 h, and most preferably for at least 1 week.

According to another embodiment the inventive method further comprises the additional step of heating the mixture of step d) and/or e) between 50° C. and 120° C., preferably between 60° C. and 110° C. and most preferably between 70° C. and 105° C. during and/or after step d) and/or e). According to another embodiment the mixture of step d) and/or e) is concentrated and/or ground during heating. According to still another embodiment no dispersant is added to the aqueous slurry in step d).

For the purpose of the present invention, the term "calcium carbonate containing material" refers to a material that comprises at least 80 wt.-% calcium carbonate, based on the total weight of the calcium carbonate containing material.

"Calcium carbonate" in the meaning of the present invention comprises ground calcium carbonate (GCC) as well as precipitated calcium carbonate (PCC).

"Ground calcium carbonate" (GCC) in the meaning of the present invention is a calcium carbonate obtained from natural sources, such as limestone, marble, calcite or chalk, and processed through a wet and/or dry treatment such as grinding, screening and/or fractionating, for example by a cyclone or classifier.

"Precipitated calcium carbonate" (PCC) in the meaning of the present invention is a synthesized material, generally obtained by precipitation following a reaction of carbon dioxide and calcium hydroxide (hydrated lime) in an aqueous environment or by precipitation of a calcium- and a carbonate source in water. Additionally, precipitated calcium carbonate can also be the product of introducing calcium and carbonate salts, calcium chloride and sodium carbonate for example, in an aqueous environment. PCC may be vaterite, calcite or aragonite.

A "suspension" or "slurry" in the meaning of the present invention comprises insoluble solids and water, and optionally further additives, and usually contains large amounts of solids and, thus, is more viscous and can be of higher density than the liquid from which it is formed.

Throughout the present document, the "particle size" of a calcium carbonate containing material is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all grains are bigger or smaller than this particle size. For the purpose of the present invention the particle size is specified as weight median particle size $d_{50}$ unless indicated otherwise. For determining the weight median particle size $d_{50}$ value for particles having a $d_{50}$ value between 0.4 and 2 μm, a Sedigraph 5120 device from the company Micromeritics, USA, can be used.

A "specific surface area (SSA)" of a calcium carbonate product in the meaning of the present invention is defined as the surface area of the mineral particle divided by the mass of the mineral particle. As used herein the specific surface area is measured by adsorption using the BET isotherm (ISO 9277: 1995) and is specified in $m^2/g$.

"Conductivity" according to the present invention shall mean the electrical conductivity of an aqueous carbonate-comprising material suspension as measured according to the measurement method defined in the examples section here below. The conductivity is specified in μS/cm and may be measured at 25° C.

For the purpose of the present invention, the term "comb polymer" refers to a comb shaped polymer which forms a sub-class of branched polymers. Comb polymers are polymers composed of comb macromolecules comprising a main chain, also referred to as back bone, with multiple trifunctional branch points from each of which a linear side chain emanates and so resembling a comb-like shape in the planar projection (cf. IUPAC, Compendium of Chemical Terminology, 2nd ed. (the "Gold Book")).

The term "specific charge" refers to the amount of electric charges in a specific amount of a polymer and is specified in C/g at a pH value of 8. In case of an anionically charged polymer, the specific charge can be determined by titration with a cationic polymer until the specific charge becomes zero at a pH value of 8.

According to the present invention the term "improved rheological stability under increased temperature" means that the rheological stability of an aqueous slurry, and preferably the viscosity of such a slurry, does not change significantly when the slurry is exposed to an increased temperature. Preferably, the viscosity of an aqueous slurry stays between 25 and 1000 mPa·s under increased temperature. An "increased temperature" in the meaning of the present invention refers to a temperature above room temperature i.e. a temperature above 20±2° C. For example, the term "increased temperature" refers to a temperature of above 60° C. and, more preferably, to a temperature between 65 and 105° C. For example, the viscosity of an aqueous slurry is between 25 and 1000 mPa·s measured at 20° C. and at 90° C.

The term "specific viscosity" in the meaning of the present invention is defined as the difference of the relative viscosity minus 1. The relative viscosity as used herein is the quotient of the solution viscosity and the solvent viscosity. The solvent viscosity is defined as the viscosity of the pure solvent and the solution viscosity is defined as the viscosity of the comb polymer dissolved in the pure solvent.

The term "specific viscosity difference" in the meaning of the present invention is defined as the difference of the specific viscosities of an aqueous polymer solution with a polymer concentration of 45 g/l in water, measured at 70° C. and at 20° C. respectively.

For the purpose of the present invention, the term "viscosity" refers to the dynamic viscosity also known as the shear viscosity. The dynamic viscosity is defined as the tangial force per unit area required to move one horizontal plane with respect to the other at unit velocity when maintained a unit distance apart the fluid. According to this definition a fluid with a viscosity of 1 Pa·s that is placed between two plates, and wherein one plate is pushed sideways with a shear stress of 1 Pa will result in moving a distance equal to the thickness of the layer between the plates in one second (The Rheology Handbook, Thomas G. Mezger, Vincentz Verlag 2002, S. 21). The dynamic viscosity may be measured with a coaxial cylinder measuring system, for example, with a Physica MCR 300 rheometer from Paar Physica equipped with a measuring temperature control cell TEZ 150 P-C and a coaxial cylinder CC 27 measuring system at a constant rotational speed of 100 l/min.

The Brookfield viscosity is defined as the viscosity measured by a Brookfield viscosimeter at 20° C.±2° C. at 100 rpm and is specified in mPa·s.

According to the present invention the "absolute value" or "modulus" of a real number is the numerical value of the real number without regards to its sign.

The "intrinsic viscosity" according to the present invention is received by extrapolation of the concentration c of a diluted solution to zero and is defined as follows:

$$[\eta] = \lim_{c,G \to 0} \frac{\eta_{sp}}{c}$$

wherein [η] is the limit of the reduced viscosity for c=0 and G=0, G is the velocity gradient and $\Delta\eta_{sp}$ is the specific viscosity. The term "intrinsic viscosity" is also known as Staudinger index in the literature.

The "cloud point (CP)" of a fluid according to the present invention is the temperature at which in water dissolved solids are no longer completely soluble at atmospheric pressure, i.e. at 101325 Pa, but precipitate as a second phase giving the fluid a cloudy appearance.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" though such a limited understanding is always included by the terms "obtained" or "defined" as a preferred embodiment.

The inventive aqueous slurry with improved rheo logical stability under increased temperature comprises a calcium carbonate containing material and at least one comb polymer wherein the viscosity of the aqueous slurry is between 25 and 1000 mPa·s measured at 20° C. and at 90° C. The specific viscosity of the at least one comb polymer of the present invention measured at 20° C. at a polymer concentration of 45 g/l differs from the specific viscosity of said polymer measured at 70° C. by a specific viscosity difference $\Delta\eta_{sp}$, wherein the absolute value of $\Delta\eta_{sp}$ is from 0.15 to 0.5. Furthermore, the at least one comb polymer according to the present invention does not have a cloud point between 20° C. and 95° C. measured in water, and has a specific charge from −10 C/g to −600 C/g at pH 8.

In the following the details and preferred embodiments of the aqueous slurry with improved rheological stability under increased temperature will be set out in more detail. Furthermore, the details and preferred embodiments of the method for producing the inventive aqueous slurry will be set out in more detail.

The Calcium Carbonate Containing Material

The aqueous slurry of the present invention comprises a calcium carbonate containing material.

According to one embodiment the calcium carbonate containing material is a ground calcium carbonate (GCC), a precipitated calcium carbonate (PCC), or a mixture thereof.

Ground (or natural) calcium carbonate (GCC) is understood to be a naturally occurring form of calcium carbonate, mined from sedimentary rocks such as limestone or chalk, or from metamorphic marble rocks. Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Ground calcium carbonate is almost exclusively of the calcitic polymorph, which is said to be trigonal-rhombohedral and represents the most stable of the calcium carbonate polymorphs. The term "source" of the calcium carbonate in the meaning of the present application refers to the naturally occurring mineral material from which the calcium carbonate is obtained. The source of the calcium carbonate may comprise further naturally occurring components such as magnesium carbonate, alumino silicate etc.

According to one embodiment of the present invention the source of ground calcium carbonate (GCC) is selected from marble, chalk, calcite, dolomite, limestone, or mixtures thereof. Preferably, the source of ground calcium carbonate is selected from marble.

According to one embodiment of the present invention the GCC is obtained by dry grinding. According to another embodiment of the present invention the GCC is obtained by wet grinding and subsequent drying.

In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case calcium carbonate containing mineral powder comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by well known processes, e.g. by flocculation, filtration or forced evaporation prior to drying. The subsequent step of drying may be carried out in a single step such as spray drying, or in at least two steps. It is also common that such a mineral material undergoes a beneficiation step (such as a flotation, bleaching or magnetic separation step) to remove impurities.

According to one embodiment, the calcium carbonate containing material comprises one ground calcium carbonate. According to another embodiment of the present invention, the calcium carbonate containing material comprises a mixture of two or more ground calcium carbonates selected from different sources of ground calcium carbonate. For example, the at least one ground calcium carbonate may comprise one GCC selected from dolomite and one GCC selected from marble.

According to another embodiment, the calcium carbonate containing material consists of only one ground calcium carbonate. According to another embodiment of the present invention, the calcium carbonate containing material consists of a mixture of two or more ground calcium carbonates selected from different sources of ground calcium carbonate.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water or by precipitation of calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms:

calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

According to one embodiment of the present invention, the calcium carbonate containing material comprises one precipitated calcium carbonate. According to another embodiment of the present invention, the calcium carbonate containing material comprises a mixture of two or more precipitated calcium carbonates selected from different crystalline forms and different polymorphs of precipitated calcium carbonate. For example, the at least one precipitated calcium carbonate may comprise one PCC selected from S-PCC and one PCC selected from R-PCC.

According to another embodiment, the calcium carbonate containing material consists of only one precipitated calcium carbonate. According to another embodiment of the present invention, the calcium carbonate containing material consists of a mixture of two or more precipitated calcium carbonates selected from different crystalline forms and different polymorphs of precipitated calcium carbonate.

According to another embodiment the calcium carbonate containing material is a mixture of ground calcium carbonate and precipitated calcium carbonate.

In addition to calcium carbonate, the calcium carbonate containing material may comprise further particles of calcium associated with magnesium and analogues or derivatives, various silicates such as clay, for example kaolin clay and/or talc and/or mica and/or analogues or derivatives, and mixtures of these fillers, such as, for example, talc-calcium carbonate or calcium carbonate-kaolin mixtures, or may additionally comprise metal oxides such as titanium dioxide and/or aluminium trioxide, metal hydroxides such as aluminium tri-hydroxide, metal salts such as sulfates carbonates such as magnesium carbonate and/or gypsum, satin white and mixtures thereof.

According to one embodiment of the present invention, the amount of calcium carbonate in the calcium carbonate containing material is at least 80 wt.-%, preferably at least 95 wt.-%, more preferably between 97 and 100 wt.-%, and most preferably between 98.5 and 99.95 wt.-%, based on the total weight of the calcium carbonate containing material.

According to one embodiment of the present invention, the calcium carbonate containing material, preferably the calcium carbonate, has a weight median particle size $d_{50}$ from 0.1 to 100 µm, preferably from 0.25 to 50 µm, more preferably from 0.3 to 5 µm, and most preferably from 0.4 to 3.0 µm.

According to another embodiment of the present invention, the calcium carbonate containing material, preferably the calcium carbonate, has a specific surface area of from 0.1 to 200 m$^2$/g, preferably from 1 to 25 m$^2$/g, more preferably from 2 to 15 m$^2$/g, and most preferably from 3 to 12 m$^2$/g, measured using nitrogen and the BET method according to ISO 9277:1995.

The Comb Polymer

In addition to the calcium carbonate containing material, the aqueous slurry of the present invention comprises at least one comb polymer, wherein the specific viscosity of the at least one comb polymer measured at 20° C. at a polymer concentration of 45 g/l differs from the specific viscosity of said polymer measured at 70° C. at the same concentration by a specific viscosity difference $\Delta\eta_{sp}$, wherein the absolute value of $\Delta\eta_{sp}$ is from 0.15 to 0.5, the at least one comb polymer does not have a cloud point between 20° C. and 95° C. measured in water, and the at least one comb polymer has a specific charge from −10 C/g to −600 C/g at pH 8.

The inventors surprisingly found that comb polymers with the aforementioned characteristics can improve the rheological stability under increased temperature of an aqueous slurry comprising a calcium carbonate containing material and such prevent unwanted viscosity increase of the slurry during its production and application at elevated temperature, e.g. at temperatures of 65° C. or more. Reduced temperature sensitivity or improved rheological stability under increased temperature is an important feature since slurries of calcium carbonate containing materials are usually produced by milling and/or dispersing and, thus, the slurries can get very hot due to the shear energy induced by grinders and/or dispersers.

Without being bound to any theory, the inventors believe that the comb polymer having a combination of the above mentioned three characteristics is adsorbed to the weakly positively charged calcium carbonate containing material particles due to its negatively charged main chain, also called polymer back bone. Furthermore, the side chains of the adsorbed comb polymer may cause a steric and/or osmotic repulsion between the particles, which may lead to a steric and/or osmotic stabilization of the calcium carbonate containing material slurry.

Furthermore, the inventors surprisingly found that an acid treatment of the calcium carbonate containing material can further improve the adsorption of the comb polymers to the calcium carbonate containing material particles.

In the meaning of the present invention a comb polymer is defined as a comb shaped polymer which forms a sub-class of branched polymers. Comb polymers are polymers composed of comb macromolecules comprising a main chain, also referred to as back bone, with multiple trifunctional branch points from each of which a linear side chain emanates and so resembling a comb-like shape in the planar projection (cf. IUPAC, Compendium of Chemical Terminology, 2nd ed. (the "Gold Book")).

For example, the at least one comb polymer can be an exact comb polymer, a regular comb polymer or a double comb polymer. An exact comb polymer is defined as a comb polymer wherein the positions of the branches are known. A regular comb polymer is defined as a comb polymer wherein the subchains between the branch points of the main chain and the terminal subchains of the main chain are identical with respect to constitution and degree of polymerization, and the side chains are identical with respect to constitution and degree of polymerization. A double comb polymer is defined as a comb polymer with a linear backbone bearing two different kinds of polymeric side chains.

However, the at least one comb polymer can also have more than two different kinds of polymeric side chains. Furthermore, the side chains can comprise cationically or anionically charged residues.

According to a preferred embodiment, the at least one comb polymer does not have a cloud point between 25° C. and 90° C., and preferably does not have a cloud point between 30° C. and 85° C.

The at least one comb polymer used in the present invention has a specific charge from −10 C/g to −600 C/g, i.e. is an anionically charged comb polymer.

The term "anionically charged" as used in the present invention is to be understood to mean that the comb polymer has a total or net charge that is negative, i.e. the sum of all positive and negative charges is negative. In other words, the polymer must possess an excess of anionically charged functional groups or residues. This means that the anionically charged comb polymer of the present invention may comprise both positively and negatively charged functional groups or residues, i.e. cationic and anionic functional groups or residues, as long as the total or net charge is negative, i.e. the comb polymer is anionic. For example, the anionically charged comb polymer may comprise only anionically charged functional groups or residues or may comprise anionically and cationically charged functional groups or residues, and thus may have an amphoteric character.

According to a preferred embodiment the at least one comb polymer has a specific negative charge from −10 to −500 C/g at pH 8, preferably from −10 C/g to −300 C/g at pH 8, and more preferably from −10 C/g to −100 C/g at pH 8.

According to another embodiment the at least one comb polymer has an intrinsic viscosity of between 5 and 100 ml/g, preferably between 7 and 80 ml/g, and most preferably between 8 and 20 ml/g as determined by the method described in the examples.

According to one embodiment the main chain of the at least one anionically charged comb polymer may comprise copolymers of unsaturated mono- or dicarbonic acids or other acids, unsaturated carbonic acid esters, unsaturated carbonic acid amides, allyl esters or vinyl ethers. Alternatively, the main chain of the anionically charged comb polymer can be a carboxyl group containing polysaccharide derived polymer or other acid group containing polysaccharide derived polymer, preferably carboxymethyl cellulose.

The side chains of the anionically charged comb polymer may comprise polymerized epoxide-containing compounds, such as, for example, ethylene oxide, propylene oxide, 1-butylene oxide, phenyl-ethylene oxide etc. It is preferred that the polyether side chains comprise polyethylene oxide or polypropylene oxide or a mixed copolymer comprising ethylene oxide and propylene oxide and have at their free end a hydroxyl group, a primary amino group or an alkyl group having between 1 and 40 carbon atoms, being straight-chain, branched or cyclical, preferably a straight chain alkyl group having between 1 and 4 carbon atoms.

The at least one anionically charged comb polymer used according to the present invention may be obtained by copolymerization of unsaturated mono or di-carbonic acids with unsaturated carbonic acid esters, unsaturated carbonic acid amides, allyl ethers or vinyl ethers, wherein the carbonic acids may be present in the form of the free acids and/or in the form of the salts thereof. Alternatively, the anionically charged comb polymer may be produced by means of polymer-analogous reactions, wherein a polymer comprising either latent or free carboxyl groups is reacted with one or more compounds comprising amine or hydroxyl functions under conditions that promote the partial amidization or, as the case may be, esterification of the carboxyl groups.

Such anionically charged comb polymers may have an intrinsic viscosity between 5 and 100 ml/g, preferably between 7 and 80 ml/g, and most preferably between 8 and 20 ml/g as determined by the method described in the examples. The carbonic acid groups or other acid groups in the polymer can be partially or fully neutralized by alkali metals or alkaline earth metals or salts of other two or three valence electron metal ions, ammonium ions, organic ammonium groups or mixtures thereof.

Comb polymers that may be used in the present invention are described in US 2009/0199741 A1, U.S. Pat. No. 6,387,176 B1, EP 1136508 A1, EP 1138697 A1, EP 1189955 A1, and EP 0736553 A1. These documents disclose processes to produce anionically charged comb polymer as well as their use in mineral based binders such as cement. Anionically charged comb polymers are also described in the product brochure "SIKA ViscoCrete®, selbstverdickender Beton SCC" available on the website www.sika.com.

Synthetic polymers with anionic charge on the backbone and non-charged side chains as dispersing agent for fillers and pigments are available under the trade name MelPers® from BASF, Germany. Anchor groups with anionic and steric character in said synthetic polymers lead to effects which can be described as following an electrosterical dispersing mechanism. These dispersing agents are preferably used in nanoscale solid systems.

EP 1 761 609 B1 describes a comb-branched copolymer dispersant having an acrylic acid containing polymeric backbone and poly-(ethylene oxide-propylene oxide) side chains. The molecular weight of this additive is 90 000 g/mol, the molecular weight of the polyalkylene oxide side chain is 3 000 g/mol, and the ethylene oxide/propylene oxide ratio is 66.8/28.7

US 2011/031652 A1 describes a commercially available comb-based copolymer which is an ethoxylated acrylic acid polymer as dispersant for gypsum. Further examples of such comb polymers can be found in WO 2011/028817 A1.

In these documents, no mention is made of the use of such polymers to improve the rheological stability under increased temperature of an aqueous slurry comprising a calcium carbonate containing material. To the contrary, these documents are mostly concerned with the preparation of concrete and gypsum. Therefore, the inventors were very surprised when they found out that such specific comb polymers can be used to produce an aqueous slurry of a calcium carbonate containing material at low and high temperatures and, furthermore, can be used to stabilize the viscosity of such a slurry at high temperatures, e.g. at temperatures between 65 to 105° C.

According to the present invention, the expression "at least one" comb polymer means that one or more comb polymers may be present in the aqueous slurry comprising the calcium carbonate containing material. According to one embodiment, only one comb polymer is present in the aqueous slurry comprising the calcium carbonate containing material. According to another embodiment, a mixture of at least two comb polymers is present in the aqueous slurry comprising the calcium carbonate containing material.

The Aqueous Slurry with Improved Rheological Stability Under Increased Temperature The aqueous slurry with improved rheological stability under increased temperature according to the present invention comprises a calcium carbonate containing material as defined above and at least one comb polymer as defined above. The viscosity of the aqueous slurry is between 25 and 1000 mPa·s measured at 20° C. and at 90° C.

It is advantageous to provide aqueous slurries with a low viscosity. Ideally, the viscosity of aqueous slurry is below 1000 mPa·s, since at values above 1000 mPa·s there is a high risk of blocking and damaging production units, such as grinding units. However, as already explained above, it is furthermore important that the viscosity is below 1000 mPa·s not only at room temperature, i.e. at 20° C.±2° C., but also at higher temperatures since the industry today is faced with the problem producing calcium carbonate containing material industrially by milling and dispersing and, thus, the slurry gets very hot due to shear induced energy by grinders and dispersers.

According to one embodiment, the viscosity of the slurry is between 25 and 800 mPa·s measured at 20° C. and at 90° C., preferably between 30 to 500 mPa·s measured at 20° C. and at 90° C., and most preferably between 35 to 300 mPa·s measured at 20° C. and at 90° C. Preferably, the viscosity is measured by a coaxial cylinder measuring system, for example, by a Physica MCR 300 rheometer (Paar Physica), e.g., equipped with a measuring temperature control cell TEZ 150 P-C and a coaxial cylinder CC 27 measuring system at a constant rotational speed of 100 l/min.

According to a preferred embodiment the comb polymer according to the present invention is present in an amount such that the obtained aqueous slurry has a viscosity between 25 and 800 mPa·s measured at 20° C. and at 90° C., preferably between 30 to 500 mPa·s measured at 20° C. and at 90° C., and most preferably between 35 to 300 mPa·s measured at 20° C. and at 90° C. Preferably, the viscosity is measured by a coaxial cylinder measuring system, for example, by a Physica MCR 300 rheometer (Paar Physica), e.g., equipped with a measuring temperature control cell TEZ 150 P-C and a coaxial cylinder CC 27 measuring system at a constant rotational speed of 100 l/min.

According to one embodiment, the aqueous slurry consists of a calcium carbonate containing material and at least one comb polymer, wherein the specific viscosity of the at least one comb polymer measured at 20° C. at a polymer concentration of 45 g/l differs from the specific viscosity of said polymer measured at 70° C. at the same concentration by a specific viscosity difference $\Delta\eta_{sp}$, wherein the absolute value of $\Delta\eta_{sp}$ is from 0.15 to 0.5, the at least one comb polymer does not have a cloud point between 20° C. and 95° C. measured in water as described in the experimental part (turbidity measurement), and the at least one comb polymer has a specific charge from −10 C/g to −600 C/g at pH 8.

According to one embodiment the aqueous slurry according to the present invention is a high solid containing aqueous slurry, e.g. a slurry having a solid content of at least 45 wt.-%, based on the total weight of the aqueous slurry. According to a preferred embodiment the aqueous slurry according to the present invention has a solid content from 45 to 82 wt.-%, preferably from 60 to 78 wt.-%, and more preferably from 70 to 78 wt.-%, based on the total weight of the aqueous slurry.

According to one embodiment the aqueous slurry according to the present invention has a pH from 7 to 12, preferably from 7.5 to 11, and more preferably from 8.5 to 10.

According to a preferred embodiment no pH adjustment of the aqueous slurry according to the present invention is needed. According to another embodiment the pH of the aqueous slurry according to the present invention is adjusted by an acid and/or a base to a pH from 7 to 12, preferably from 7.5 to 11, and more preferably from 8.5 to 10. Possible bases for adjusting the pH are, for example, NaOH and amine compounds like ammonia, trimethylamine or triethylamine. Possible acids for adjusting the pH are, for example, citric acid, oxalic acid, phosphoric acid, sulfuric acid, arsenic acid, and iodic acid. Preferably, the acids for adjusting the pH are weak acids, as for example citric acid, having a $pK_a$ value above zero.

According to one embodiment the comb polymer is present in an amount from 0.01 to 10 wt.-%, based on the total weight of the solids in the slurry, preferably from 0.05 to 5 wt.-%, more preferably from 0.1 to 3.0 wt.-%, even more preferably from 0.2 to 2.0 wt.-%, and most preferably from 0.25 to 1.5 wt.-% or from 0.5 to 1.25 wt.-%.

According to another embodiment the aqueous slurry according to the present invention does not contain an additive, e.g. a dispersant, having a specific charge of more than −500 C/g at pH 8.

According to another embodiment of the present invention the viscosity of the obtained aqueous slurry at 40° C. is equal or higher than the viscosity at 90° C. of the same slurry.

According to another embodiment of the present invention the aqueous slurry has an improved rheological stability under increased temperature for at least 30 min, preferably for at least 1 h, more preferably for at least 12 h, even more preferably for at least 24 h and most preferably for at least 1 week. For example, the viscosity of the aqueous slurry is between 25 and 1000 mPa·s measured at 20° C. and 90° C. for at least 30 min, preferably for at least 1 h, more preferably for at least 12 h, even more preferably for at least 24 h and most preferably for at least 1 week. The aqueous slurry can also have an improved rheological stability under increased temperature for at least 2 h, 3 h, 4 h, 5 h, 6 h, 8 h, 10 h, 16 h, 20 h, 24 h, 2 days, 3 days, 4 days, 5 days, 6 days, 2 weeks, 3 weeks, 1 month, or 6 months.

Method for Producing the Aqueous Slurry with Improved Rheological Stability Under Increased Temperature A method for producing an aqueous slurry with improved rheological stability under increased temperature is provided comprising the steps of,
  a) providing a calcium carbonate containing material,
  b) providing water,
  c) providing at least one comb polymer,
    wherein the specific viscosity of the at least one comb polymer measured at 20° C. at a polymer concentration of 45 g/l differs from the specific viscosity of said polymer measured at 70° C. by a specific viscosity difference $\Delta\eta_{sp}$, wherein the absolute value of $\Delta\eta_{sp}$ is from 0.15 to 0.5,
    the at least one comb polymer does not have a cloud point between 20° C. and 95° C. measured in water, and
    the at least one comb polymer has a specific charge from −10 C/g to −600 C/g at pH 8,
  d) mixing the calcium carbonate containing material of step a) with the water of step b),
  e) mixing the at least one comb polymer of step c) with the calcium carbonate containing material before and/or during and/or after step d),
    wherein the at least one comb polymer is added in an amount, such that the viscosity of the aqueous slurry is between 25 and 1000 mPa·s measured at 20° C. and at 90° C.

According to the method step d), the calcium carbonate containing material of step a) is mixed with the water of step b).

According to the method step e), the at least one comb polymer of step c) is mixed with the calcium carbonate containing material before and/or during and/or after step d).

According to one embodiment of the present invention, the at least one comb polymer of step c) is, in a first step, mixed with the calcium carbonate containing material of step a), and then, in a second step with the water of step b).

According to one exemplary embodiment of the present invention, the at least one comb polymer of step c) is mixed with the calcium carbonate containing material of step d).

According to another embodiment of the present invention, the at least one comb polymer of step c) is, in a first step, mixed with the water of step b), and then, the obtained solution is mixed with the calcium carbonate containing material of step a).

According to another embodiment of the present invention, the at least one comb polymer of step c) and the calcium carbonate containing material of step a) are mixed in one step with the water of step b).

According to an exemplary embodiment, the calcium carbonate containing material of step a) contains a ground calcium carbonate which is obtained by wet grinding a calcium carbonate containing material and step e) is carried out before and/or during and/or after wet grinding the calcium carbonate containing material.

The mixing step may be carried out under mixing and/or homogenizing and/or particle dividing conditions. The skilled person will adapt these mixing and/or homogenizing conditions such as the mixing speed and temperature according to his process equipment. For example, the mixing and homogenizing may take place by means of a ploughshare mixer. Ploughshare mixers function by the principle of a fluidized bed produced mechanically. Ploughshare blades rotate close to the inside wall of a horizontal cylindrical drum and convey the components of the mixture out of the product bed and into the open mixing space. The fluidized bed produced mechanically ensures intense mixing of even large batches in a very short time. Choppers and/or dispersers are used to disperse lumps in a dry operation. Equipment that may be used in the inventive process is available, for example, from Gebrüder Lodige Maschinenbau GmbH, Germany.

According to one embodiment of the present invention, mixing is carried out using a fluidized bed mixer or ploughshare mixer.

According to another embodiment of the present invention, mixing is carried out in a milling device, preferably in a ball mill, preferably in combination with a cyclone device that re-circulates agglomerates and/or aggregates formed during mixing back to the inlet of the milling device. A cyclone device enables the separation of particulate material such as particles, agglomerates or aggregates, into fractions of smaller and larger particulate material based on gravity.

According to an exemplary embodiment, the calcium carbonate containing composite particles formed during method steps d) and/or e) are divided into smaller particles. The term "dividing" as used in the present invention means that particles are split into smaller particles. This may be done by grinding, e.g. using a ball mill, a hammer mill, a rod mill, a vibrating mill, a roll crusher, a centrifugal impact mill, a vertical bead mill, an attrition mill, a pin mill, a hammer mill, a pulveriser, a shredder, a de-clumper, or a knife cutter. However, any other device that is able to divide the calcium carbonate containing composite particles formed during method steps d) and/or e) into smaller particles may be used.

The mixing may be carried out at room temperature, i.e. at 20° C.±2° C., or at other temperatures. According to one embodiment the mixing is carried out at a temperature from 5 to 140° C., preferably from 10 to 110° C. and most preferably from 20° C. to 105° C., or at other temperatures. According to another embodiment of the invention the mixing is carried out at high temperatures from 70° C. to 105° C. Heat may be introduced by internal shear or by an external source or a combination thereof.

According to another embodiment of the invention, the water of step b) is preheated before it is mixed with the calcium carbonate containing material in step d).

According to one embodiment of the present invention, mixing is carried out for at least 1 s, preferably for at least 1 min, e.g. for at least 15 min, 30 min, 1 hour, 2 hours, 4 hours, 6 hours, 8 hours, or 10 hours.

According to an optional embodiment of the present invention, the method comprises the additional step of heating the mixture of step d) and/or e) between 50° C. and 120° C., preferably between 60° C. and 110° C. and most preferably between 70° C. and 105° C. during and/or after step d) and/or e), e.g., by use of internal shear or by an external source or a combination thereof.

The solids content of the aqueous slurry obtained by the inventive method can be adjusted by the methods known to the skilled person. To adjust the solids content of an aqueous mineral material comprising slurry, the slurry may be partially or fully dewatered by a filtration, centrifugation or thermal separation process. For example, the slurry may be partially or fully dewatered by a filtration process such as nanofiltration or a thermal separation process such as an evaporation process. Alternatively, water may be added to the solid mineral material until the desired solids content is obtained. Additionally or alternatively, a slurry having an appropriate lower content of solid particles may be added to the particulate material of the mixed slurry until the desired solid content is obtained.

According to a preferred embodiment of the present invention, the solid content of the mixed slurry obtained by the method of the present invention is adjusted to a high solid content so that it is from 45 to 82 wt.-%, preferably from 60 to 78 wt.-%, more preferably from 70 to 78 wt.-%, based on the total weight of the aqueous suspension. According to one embodiment, the up-concentrating step can be carried out during and/or after step e).

According to another optional embodiment of the present invention, the method comprises the additional step of heating the mixture of step d) and/or e) between 50° C. and 120° C., preferably between 60° C. and 110° C. and most preferably between 70° C. and 105° C. during and/or after step d) and/or e), and furthermore, the mixture of step d) and/or e) is concentrated and/or ground during the heating. Heating can be carried out by use of internal shear or by an external source or a combination thereof. Up-concentration can be carried out by the methods known to the skilled person, for example, by a filtration, centrifugation or thermal separation process. Grinding can be carried out by the methods known to the skilled person, e.g. using a ball mill, a hammer mill, a rod mill, a vibrating mill, a roll crusher, a centrifugal impact mill, a vertical bead mill, an attrition mill, a pin mill, a hammer mill, a pulveriser, a shredder, a de-clumper, or a knife cutter.

According to a preferred embodiment, no dispersant is added to the aqueous slurry in step d).

According to one embodiment after the mixing steps d) and/or e) the aqueous slurry has a pH from 7 to 12, preferably from 7.5 to 11, and more preferably from 8.5 to 10.

According to a preferred embodiment the at least one comb polymer is added in the method step e) in an amount from 0.01 to 10 wt.-%, based on the total weight of the solids in the slurry, preferably from 0.05 to 5 wt.-%, more preferably from 0.1 to 3.0 wt.-%, even more preferably from 0.2 to 2.0 wt.-%, and most preferably from 0.25 to 1.5 wt.-% or from 0.5 to 1.25 wt.-%.

According to one embodiment, the at least one comb polymer is added in the method step e) in an amount such that the obtained calcium carbonate containing aqueous slurry has a viscosity between 25 and 800 mPa·s measured at 20° C. and at 90° C., preferably between 30 to 500 mPa·s at 20° C. and at 90° C., and most preferably between 35 to 300 mPa·s measured at 20° C. and at 90° C.

According to one embodiment no additive, e.g. dispersant, having a specific charge of more than −500 C/g at pH 8 is added to the aqueous slurry.

According to another embodiment of the present invention the aqueous slurry is used in paper, plastics, paint, coatings, concrete and/or agriculture applications, wherein preferably the aqueous slurry is used in wet end process of a paper machine, in cigarette paper, board, and/or coating applications, or as a support for rotogravure and/or offset and/or ink jet printing and/or continuous ink jet printing and/or flexography and/or electrophotography and/or decoration surfaces, or the aqueous slurry is used to reduce sun light and UV exposure of plant leaves.

According to another embodiment of the present invention, a method for producing composite particles is provided comprising the steps a) to e) according to the inventive method for producing an aqueous slurry with improved rheological stability under increased temperature, and a further step f) of drying the obtained slurry. The slurry of the present invention may be dried, for example, thermally, e.g. by means of a spray drier or a microwave or in an oven, or mechanically, e.g. by filtration, or lowering the water content. Due to their improved rheological stability under increased temperature, the aqueous slurries of the present invention can be dried by spray drying at high temperatures, e.g. at temperatures of above 60° C., and even at high solids content, e.g. at a solids content of above 45 wt.-%, based on the total weight of the aqueous suspension. Composite particles comprising calcium carbonate containing material and at least one comb polymer are obtainable by such a method. Afterwards, the composite particles can be mixed with water again. The composite particles produced by the inventive method show reduced heat sensitivity when redispersed in water.

According to another embodiment of the present invention the composite particles obtainable by drying the slurry in a further step f) are used in paper, plastics, paint, coatings, concrete and/or agriculture applications, wherein preferably the composite particles are used in wet end process of a paper machine, in cigarette paper, board, and/or coating applications, or as a support for rotogravure and/or offset and/or ink jet printing and/or continuous ink jet printing and/or flexography and/or electrophotography and/or decoration surfaces, or the composite particles are used to reduce sun light and UV exposure of plant leaves.

The scope and interest of the invention will be better understood based on the following examples which are intended to illustrate certain embodiments of the invention and are non-limitative.

EXAMPLES

1. Measurement Methods pH Measurement

The pH was measured at 25° C. using a Mettler Toledo Seven Easy pH meter and a Mettler Toledo InLab® Expert Pro pH electrode. A three point calibration (according to the segment method) of the instrument was first made using commercially available buffer solutions having pH values of 4, 7 and 10 at 20° C. (from Aldrich). The reported pH values were the endpoint values detected by the instrument (the endpoint was when the measured signal differs by less than 0.1 mV from the average over the last 6 seconds).

Particle Size Distribution (Mass % Particles with a Diameter<X) and Weight Median Grain Diameter ($d_{50}$) of Particulate Material Weight median grain diameter and grain diameter mass distribution of a particulate material were determined via the sedimentation method, i.e. an analysis of sedimentation behaviour in a gravimetric field. The measurement was made with a Sedigraph™ 5120.

The method and the instrument are known to the skilled person and are commonly used to determine grain size of fillers and pigments. The measurement was carried out in an aqueous solution of 0.1% by weight of $Na_4P_2O_7$. The samples were dispersed using a high speed stirrer and ultrasonic.

Weight Solids (wt.-%) of a Material in Slurry

The weight solids were determined by dividing the weight of the solid material by the total weight of the aqueous slurry. The weight solids content was determined using a Moisture Analyser MJ 33, Mettler Toledo.

Specific Surface (BET) Measurement

The specific surface area (in $m^2/g$) of the mineral filler was determined using nitrogen and the BET method, which is well known to the skilled man (ISO 9277:1995). The total surface area (in $m^2$) of the mineral filler was then obtained by multiplication of the specific surface area and the mass (in g) of the mineral filler. The method and the instrument are known to the skilled person and are commonly used to determine specific surface of fillers and pigments.

Specific Charge (C/g)

The cationic polymer demand that is necessary to achieve a charge value of zero was measured using the Mettler DL 77 titrator and the Mütec PCD-02 detector by means of the cationic titration method. The cationic reagent was N/200 (0.005 N) methyl glycol chitosan (chitosan), and the anionic reagent was N/400 (0.0025 N) K-polyvinyl-sulfate (KPVS), both sold by WAKO Chemicals GmbH.

If necessary, the sample was adjusted to pH 8.0±0.1 with NaOH (0.1M) prior to measurement.

Since experience showed that the first titration is not correct, 10 ml water were first prepared in the detector followed by the addition of 0.5 ml KPVS. Afterwards, titration with chitosan was made until it is back to shortly after the equivalence point. Subsequently, the measurements were started. Between 0.5 and 2.0 ml of 0.005 molar reagent were used up during the titration to obtain reproducible values.

To avoid rapid sedimentation, the sample was drawn under stirring, by means of a tared syringe. The content of the syringe was then rinsed into the sample vessel by means of distilled water. Afterwards, the detector was filled with distilled water up to the lower edge and the piston was inserted carefully. Subsequently, the cationic titration solution was put on the memotitrator and the top of the burette was fixed at the detector ensuring that it did not come into contact with the detector or the liquid. After each titration, the development of the titration was verified with the aid of the titration curve.

Calculation of the Electrochemical Charge:

$$\text{Charge}[\mu Val/g] = \frac{V \cdot c \cdot z \cdot t}{E \cdot F} \cdot K$$

wherein K=+1 000
V: Consumption chitosan [ml]
c: Concentration chitosan [mol/l]
t: Titer factor chitosan
E: Weight-in quantity [g]
F: Mass fraction solids [g/g]
z: Valence (equivalence number)

The obtained charge value of μVal/g was converted into C/g by multiplication with the Faraday constant as follows:

[C/g]=[μVal/g]·0.096485.

Electrical Conductivity Measurement

The conductivity of a suspension was measured at 25° C. using Mettler Toledo Seven Multi instrumentation equipped with the corresponding Mettler Toledo conductivity expansion unit and a Mettler Toledo InLab®730 conductivity probe, directly followed stirring this suspension at 1 500 rpm using Pendraulik tooth disc stirrer.

The instrument was first calibrated in the relevant conductivity range using commercially available conductivity calibration solutions from Mettler Toledo. The influence of the temperature on conductivity was automatically corrected by the linear correction mode.

Measured conductivities are reported for the reference temperature of 25° C. The reported conductivity values were the endpoint values detected by the instrument (the endpoint was when the measured conductivity differed by less than 0.4% from the average over the last 6 seconds).

Brookfield Viscosity

The Brookfield viscosity was measured after 1 minute of stirring by the use of a RVT model Brookfield™ viscometer at a temperature of 20° C. (±2° C.), and a rotation speed of 100 rpm (revolutions per minute) with the appropriate disc spindle from N° 1 to 5. In the following examples the Brookfield viscosity was measured during and after the addition of the polymer to the aqueous slurries to determine the amount of polymer actually needed to obtain a Brookfield viscosity within a defined range.

Intrinsic Viscosity

The intrinsic viscosity was determined by a Schott AVS 350 system. The samples were dissolved in an aqueous 0.2 mol/l NaCl solution, adjusted to pH 10 using NaOH. Measurements were performed at 25° C. with a capillary type 0a and corrected using the Hagenbach correction.

Dynamic Viscosity at Different Temperatures

The viscosity was measured with a Physica MCR 300 rheometer (Paar Physica) equipped with the measuring temperature control cell TEZ 150 P-C and the coaxial cylinder CC 27 measuring system. The reported viscosity values were measured at a constant rotational speed of 100 l/min. The temperature was changed manually. The temperature was maintained constant within an estimated precision of ±0.2° C. The measurement of the viscosity was started once the temperature was stable. For a specific temperature the reported viscosity value was the average out of 10 measurement points (6 s/measurement point). The temperature was varied between 20° C. and 90° C. To avoid evaporation, the surface of the slurry was covered with a thin layer of nonane (Aldrich article number: N29406). In the following examples the dynamic viscosity was determined with said Physica MCR 300 rheometer at temperatures above room temperature, especially at temperatures of 40, 60, and 90° C.

Specific Viscosity and Specific Viscosity Difference

The term "specific viscosity" in the meaning of the present invention is defined as the difference of the relative viscosity minus 1:

$$\eta_{sp} = \eta_{rel} - 1$$

The relative viscosity as used herein is the quotient of the solution viscosity and the solvent viscosity:

$$\eta_{rel} = \frac{\eta}{\eta_0}$$

wherein the solvent viscosity $\eta_o$ is defined as the viscosity of the pure solvent and the solution viscosity $\eta$ is defined as the viscosity of the comb polymer dissolved in the pure solvent.

However, to determine the relative viscosity it is sufficient to measure the elution time t (of the solution) and $t_0$ (of the solvent) at a given temperature if the boundary conditions are constant. Therefore, the relative viscosity may be defined as $$\eta_{rel} = \frac{t}{t_0}$$

and, thus, the specific viscosity may be defined as:

$$\eta_{sp} = \frac{t}{t_0} - 1$$

The term "specific viscosity difference" in the meaning of the present invention is defined as the difference of the specific viscosities measured at 70° C. and at 20° C.

$$\Delta\eta_{sp} = \eta_{sp\,70°\,C.} - \eta_{sp\,20°\,C.}$$

The specific viscosity of the polymer was obtained from an aqueous polymer solution with a polymer concentration of 45 gain water. The elution time t and $t_0$ was measured at 20° C. and at 70° C. and $\eta_{sp}$ and $\Delta\eta_{sp}$ were calculated according to the above mentioned formulas.

The specific viscosity was determined by a Schott AVS 350 system. The samples were dissolved in an aqueous 0.2 mol/l NaCl solution, adjusted to pH 10 using NaOH. Measurements were performed at 25° C. with a capillary type 0a and corrected using the Hagenbach correction.

Turbidity Measurement (Cloud Point)

The turbidity or cloud point of a polymer solution was measured in an aqueous 0.2 mol/l NaCl solution adjusted to pH 10 with NaOH. The polymer concentration was 45 g/l.

10 ml of solution was filled in a 20 ml test-tube which is closed at the top with aluminium foil. ⅔ of the test tube length was immersed in an oil bath and the temperature was adjusted. Once the target temperature was reached, the temperature was maintained at a constant level for at least 15 minutes. After the 15 minutes the test tube was lift out of the oil bath and the turbidity was immediately evaluated visually. The temperature of the oil bath was gradually raised in steps of 10° C. from 40° C. up to 100° C.

The turbidity was evaluated by naked eye. No turbidity or cloud point means that the polymer solution remains clear and transparent.

2. Additives

Polymer A (comparative):
MelPers 0045, available from BASF, Germany.
Specific charge: −49 C/g measured at pH 5.9 and −69 C/g measured at pH 8.
Intrinsic viscosity: 25.6 ml/g.
Polymer B (inventive):
MelPers 4343, available from BASF, Germany.
Specific charge: −92 C/g measured at pH 8.
Intrinsic viscosity: 12.5 ml/g.
Polymer C (inventive):
MelPers 2450, available from BASF, Germany.
Specific charge: −97 C/g measured at pH 8.
Intrinsic viscosity: 10.9 ml/g.
Polymer D (comparative):
Sodium/magnesium polyacrylate as described in U.S. Pat. No. 4,868,228.
Specific charge: −931 C/g measured at pH 8.
Mw=6 000 g/mol (polydispersity: 2.6).
Intrinsic viscosity: 6.8 ml/g.
The specific viscosities of the polymers A to D as a function of the temperature are shown in FIG. 1.

TABLE 1

Properties (absolute value of the specific viscosity
difference as well as cloud point) of the polymers A to D

| Polymer | Absolute value of the specific viscosity difference $\Delta\eta_{sp}$ | Cloud point |
| --- | --- | --- |
| A (MelPers 0045) | 0.810 | No* |
| B (MelPers 4343) | 0.385 | No* |
| C (MelPers 2450) | 0.200 | No* |
| D | 0.11 | No* |

*No cloud point means that no cloud point (no turbidity) is observed between 20° C. and 95° C.

3. Examples

Example 1

Comparative Example

A natural calcium carbonate of Norwegian origin was obtained by first autogenously dry grinding by a hammer mill 10 to 300 mm calcium carbonate rocks to a fineness corresponding to a $d_{50}$ value of between 42 to 48 μm, and subsequently wet grinding this dry-ground product at 30 to 35° C. in water in a 1.4-liter vertical attritor mill (Dynomill) at a weight solids content of between 72 and 73 wt.-%, based on the total weight of the slurry, until 98% of the particles had a diameter below 2.7 μm, 90% had a diameter below 2 μm and $d_{50}$ equals 0.80 μm. During the grinding processes, 0.70 wt.-%, based on the total weight of solids in the slurry, of polymer A was added to obtain a Brookfield viscosity between 100 and 500 mPa·s.

The viscosity of the slurry as a function of the temperature is shown in the table below. The slurry viscosity was decreasing with increasing temperature.

TABLE 2

Viscosities of slurry of Example 1 at different temperatures

| Temperature [° C.] | Slurry Viscosity [mPa · s] |
| --- | --- |
| 40 | 73 |
| 60 | 95 |
| 90 | >1000 (not measurable) |

Example 2

Inventive Example

A natural calcium carbonate of Norwegian origin was obtained by first autogenously dry grinding by a hammer mill 10 to 300 mm calcium carbonate rocks to a fineness corresponding to a $d_{50}$ value of between 42 to 48 μm, and subsequently wet grinding this dry-ground product at 52 to 58° C. in water in a 1.4-liter vertical attritor mill (Dynomill) at a weight solids content of between 75 and 76 wt.-%, based on the total weight of the slurry, until 98% of the particles had a diameter below 2.9 μm, 89% had a diameter below 2 μm and $d_{50}$ equals 0.79 μm. During the grinding processes, 0.6 wt.-%, based on the total weight of solids in the slurry, of polymer B was added to obtain a Brookfield viscosity between 200 and 300 mPa·s. The final slurry had a solids content of 75.6 wt.-%, based on the total weight of the slurry, a pH of 8.6, a conductivity of 550 μS/cm and a Brookfield viscosity (100 rpm; 5 s/60 s/120 s) of 238/241/246 mPa·s.

The viscosity of the slurry as a function of the temperature is shown in the table below. The slurry viscosity was decreasing with increasing temperature.

TABLE 3

Viscosities of slurry of Example 2 at different temperatures

| Temperature [° C.] | Slurry Viscosity [mPa · s] |
| --- | --- |
| 40 | 240 |
| 60 | 178 |
| 90 | 131 |

Example 3

Inventive Example

A natural calcium carbonate of Norwegian origin was obtained by first autogenously dry grinding by a hammer mill to 10 to 300 mm calcium carbonate rocks to a fineness corresponding to a $d_{50}$ value of between 42 to 48 μm, and subsequently wet grinding this dry-ground product at 54 to 58° C. in water in a 1.4-liter vertical attritor mill (Dynomill) at a weight solids content of between 75 and 76 wt.-%, based on the total weight of the slurry, until 98% of the particles had a diameter below 3.05 μm, 89% had a diameter below 2 μm and $d_{50}$ equals 0.78 μm. During the grinding processes, 0.94 wt.-%, based on the total weight of solids in the slurry, of polymer C was added to obtain a Brookfield viscosity between 100 and 200 mPa·s. The final slurry had a solids content of 75.6 wt.-%, based on the total weight of the slurry, a pH of 8.4, a conductivity of 452 μS/cm and a Brookfield viscosity (100 rpm; 5 s/60 s/120 s) of 162/168/175 mPa·s.

The viscosity of the slurry as a function of the temperature is shown in the table below. The slurry viscosity was decreasing with increasing temperature.

TABLE 4

Viscosities of slurry of Example 3 at different temperatures

| Temperature [° C.] | Slurry Viscosity [mPa · s] |
| --- | --- |
| 40 | 82 |
| 60 | 53 |
| 90 | 40 |

Example 4

Comparative Example

Norwegian marble rocks of the region of Molde, Norway having a diameter of 10-300 mm were autogenously dry ground (i.e. in absence of grinding media) to a fineness of a $d_{50}$ in the range of 42-48 μm.

This mineral was wet ground at 10-15 wt.-% solid content in tap water in a vertical attritor mill (Dynomill) in a recirculation mode without adding additives, such as dispersing and/or grinding aids to a fineness until 75 wt.-% of the particle had a diameter<1 μm and 12 wt.-% of the particle had a diameter<0.2 μm. After grinding the product had a median diameter $d_{50}$ of 0.60 μm.

The obtained mineral slurry was filter pressed and re-dispersed in water using 0.15 wt.-% phosphoric acid and 0.4 wt.-% polymer A, based on the total weight of solids in the slurry. The solids content of this slurry was 51 wt.-% based on the total weight of the slurry.

The obtained mineral was further thermally up-concentrated in an evaporator operating at ambient pressure. The slurry was pumped through a heat exchanger operating at 170° C.

Once the slurry heated to boiling temperature, the slurry became thick and blocked the pump. The up-concentration procedure had to be stopped. After cooling down to room temperature, the slurry had a Brookfield viscosity of below 1000 mPa·s and a solids content of 60.2 wt.-%, based on the total weight of the slurry.

Example 5

Inventive Example

Norwegian marble rocks of the region of Molde, Norway having a diameter of 10-300 mm were autogenously dry ground (i.e. in absence of grinding media) to a fineness of a $d_{50}$ in the range of 42-48 µm.

This mineral was wet ground at 10-15 wt.-% solid content in tap water in a vertical attritor mill (Dynomill) in a recirculation mode without adding additives, such as dispersing and/or grinding aids to a fineness until 75 wt.-% of the particle had a diameter<1 µm and 12 wt.-% of the particle had a diameter<0.2 µm. After grinding the product had a median diameter $d_{50}$ of 0.60 µm.

The obtained mineral slurry was filter pressed and re-dispersed in tap water (Hardness 33 fH°) using 0.15 wt.-% phosphoric acid and 0.4 wt.-% polymer C, based on the total weight of solids in the slurry. The solids content of this slurry was 52 wt.-%, based on the total weight of the slurry.

The obtained mineral was further thermally up-concentrated in an evaporator operating at ambient pressure. The slurry was pumped through a heat exchanger operating at 170° C.

After 4 h thermal up-concentration, the slurry had a solids content of 66.5 wt % and a Brookfield viscosity (measured at 20° C.±2° C.; 100 rpm; 60 s) of 420 mPa·s.

Example 6

Comparative Example

A natural calcium carbonate of Norwegian origin was obtained by first autogenously dry grinding 10 to 300 mm calcium carbonate rocks to a fineness corresponding to a $d_{50}$ value of between 42 to 48 µm, and subsequently wet grinding this dry-ground product at 30 to 35° C. in water in a 1.4-liter vertical attritor mill (Dynomill) at a weight solids content of between 75 and 76 wt.-%, based on the total weight of the slurry, until 60 wt.-% of the particles had a diameter<2 µm, 33 wt.-% had a diameter of <1 µm, 8 wt.-% had a diameter<0.2 µm, and a $d_{50}$ value of 1.4 µm was reached.

During the grinding processes, 0.45 wt.-%, based on the total weight of solids in the slurry, of polymer D was added to obtain a Brookfield viscosity between 100 and 500 mPa·s. 70 mol-% of the carboxylic groups of the polymer D contained sodium ions as counter ions and 30 mol-% calcium ions. The specific surface of the finally ground calcium carbonate was 6.9 m²/g The viscosity of the slurry as a function of the temperature is shown in the table below. The slurry viscosity was decreasing with increasing temperature.

TABLE 5

Viscosities of slurry of Example 6 at different temperatures

| Temperature [° C.] | Slurry Viscosity [mPa · s] |
|---|---|
| 40 | 40 |
| 60 | 29 |
| 90 | 28 |

TABLE 6

Results of wet-grinding

| Example | Polymer | Absolute value of the specific viscosity difference $\Delta\eta_{sp}$ | Cloud point * | Slurry viscosity at 40° C. [mPa · s] | Slurry viscosity at 90° C. [mPa · s] |
|---|---|---|---|---|---|
| 1 (comparative) | A | 0.810 | No | 73 | >1000 |
| 2 (inventive) | B | 0.385 | No | 240 | 131 |
| 3 (inventive) | C | 0.200 | No | 82 | 40 |
| 6 (comparative) | D | 0.11 | No | 40 | 28 |

* No cloud point means that no cloud point (no turbidity) is observed between 20° C. and 95° C.

TABLE 7

Results of thermal concentration

| Example | Polymer | Absolute value of the specific viscosity difference $\Delta\eta_{sp}$ | Cloud point * | Viscosity of slurry at the up concentration temperature (~95° C.) [mPa · s] |
|---|---|---|---|---|
| 4 (comparative) | A | 0.810 | No | >1000 (blocking of the equipment) |
| 5 (inventive) | C | 0.200 | No | Below 500 |

* No cloud point means that no cloud point (no turbidity) is observed between 20° C. and 95° C.

As can be seen from Table 6 the slurry of comparative Example 1 became highly viscous when increasing the temperature. At a temperature of 90° C. the slurry had a viscosity of >1000 mPa·s and, thus, there would be a high risk of blocking and damaging production units. This is impressively demonstrated by the slurry of Example 4. Once the slurry was heated to boiling temperature, the slurry became thick and blocked the pump (see Table 7). The up-concentration procedure had to be stopped. This problem was not observed with the inventive slurries 2, 3 and 5. In contrast to Example 4, the inventive slurry of example 5 did not became thick and, therefore, did not block the pump when heated to boiling temperature. Even after 4 h the viscosity of the slurry at the up-concentration temperature of ~95° C. was below 500 mPa·s. Comparative Example 6 seems to have a very low viscosity at first sight. The value at 40° C. is 40 mPa·s and at 90° C. 28 mPa·s. However, this is caused by the fact, that the specific charge of the polymer used in example 6 is −931 C/g and, therefore, very high. That in turn may cause significant disadvantages for example flocculation in coating colours.

The invention claimed is:

1. An aqueous slurry with improved rheological stability under increased temperature comprising:
   (i) a calcium carbonate containing material, and
   (ii) at least one comb polymer,
   wherein the specific viscosity of the at least one comb polymer measured at 20° C. at a polymer concentration of 45 g/l differs from the specific viscosity of said polymer measured at 70° C. by a specific viscosity difference $\Delta\eta_{sp}$, wherein the absolute value of $\Delta\eta_{sp}$ is from 0.15 to 0.5,
   wherein the at least one comb polymer does not have a cloud point between 20° C. and 95° C. measured in water,
   wherein the at least one comb polymer has a specific charge from −10 C/g to −600 C/g at pH 8, and
   wherein the viscosity of the aqueous slurry is between 25 and 1000 mPa·s measured at 20° C. and at 90° C.

2. The aqueous slurry according to claim 1, wherein the amount of calcium carbonate in the calcium carbonate containing material is at least 80 wt.-%, based on the total weight of the calcium carbonate containing material.

3. The aqueous slurry according to claim 1, wherein the amount of calcium carbonate in the calcium carbonate containing material is at least 95 wt.-%, based on the total weight of the calcium carbonate containing material.

4. The aqueous slurry according to claim 1, wherein the calcium carbonate containing material has a weight median particle size $d_{50}$ from 0.1 to 100 µm.

5. The aqueous slurry according to claim 1, wherein the calcium carbonate containing material has a weight median particle size $d_{50}$ from 0.25 to 50 µm.

6. The aqueous slurry according to claim 1, wherein the calcium carbonate containing material has a weight median particle size $d_{50}$ from 0.3 to 5 µm.

7. The aqueous slurry according to claim 1, wherein the calcium carbonate containing material is a ground calcium carbonate (GCC), a precipitated calcium carbonate (PCC), or a mixture thereof.

8. The aqueous slurry according to claim 1, wherein the aqueous slurry has a solid content from 45 to 82 wt.-%, based on the total weight of the aqueous slurry.

9. The aqueous slurry according to claim 1, wherein the aqueous slurry has a solid content from 60 to 78 wt.-%, based on the total weight of the aqueous slurry.

10. The aqueous slurry according to claim 1, wherein the aqueous slurry has a solid content from 70 to 78 wt.-%, based on the total weight of the aqueous slurry.

11. The aqueous slurry according to claim 1, wherein the aqueous slurry has a pH from 7 to 12.

12. The aqueous slurry according to claim 1, wherein the aqueous slurry has a pH from 7.5 to 11.

13. The aqueous slurry according to claim 1, wherein the aqueous slurry has a pH from 8.5 to 10.

14. The aqueous slurry according to claim 1, wherein the at least one comb polymer has a specific charge from −10 C/g to −500 C/g at pH 8.

15. The aqueous slurry according to claim 1, wherein the at least one comb polymer has a specific charge from −10 C/g to −300 C/g at pH 8.

16. The aqueous slurry according to claim 1, wherein the at least one comb polymer has a specific charge from −10 C/g to −100 C/g at pH 8.

17. The aqueous slurry according to claim 1, wherein the at least one comb polymer has an intrinsic viscosity of 5 to 100 ml/g.

18. The aqueous slurry according to claim 1, wherein the at least one comb polymer has an intrinsic viscosity of 7 to 80 ml/g.

19. The aqueous slurry according to claim 1, wherein the at least one comb polymer has an intrinsic viscosity of 8 to 20 ml/g.

20. The aqueous slurry according to claim 1, wherein the at least one comb polymer does not have a cloud point between 25° C. and 90° C.

21. The aqueous slurry according to claim 1, wherein the at least one comb polymer does not have a cloud point between 35° C. and 85° C.

22. The aqueous slurry according to claim 1, wherein the at least one comb polymer is present in an amount from 0.01 to 10 wt.-%, based on the total weight of the solids in the slurry.

23. The aqueous slurry according to claim 1, wherein the at least one comb polymer is present in an amount from 0.05 to 5 wt.-%, based on the total weight of the solids in the slurry.

24. The aqueous slurry according to claim 1, wherein the at least one comb polymer is present in an amount from 0.1 to 3 wt.-%, based on the total weight of the solids in the slurry.

25. The aqueous slurry according to claim 1, wherein the at least one comb polymer is present in an amount from 0.2 to 2 wt.-%, based on the total weight of the solids in the slurry.

26. The aqueous slurry according to claim 1, wherein the at least one comb polymer is present in an amount from 0.25 to 1.5 wt.-%, based on the total weight of the solids in the slurry.

27. The aqueous slurry according to claim 1, wherein the at least one comb polymer is present in an amount such that the obtained aqueous slurry has a viscosity between 25 and 800 mPa·s measured at 20° C. and at 90° C.

28. The aqueous slurry according to claim 1, wherein the at least one comb polymer is present in an amount such that the obtained aqueous slurry has a viscosity between 30 and 500 mPa·s measured at 20° C. and at 90° C.

29. The aqueous slurry according to claim 1, wherein the at least one comb polymer is present in an amount such that the obtained aqueous slurry has a viscosity between 35 and 300 mPa·s measured at 20° C. and at 90° C.

30. The aqueous slurry according to claim 1, wherein the aqueous slurry does not contain an additive having a specific charge of more than −500 C/g at pH 8.

31. The aqueous slurry according to claim 1, wherein the viscosity of the aqueous slurry at 40° C. is equal or higher than the viscosity at 90° C.

32. The aqueous slurry according to claim 1, wherein the aqueous slurry has an improved rheological stability under increased temperature for at least 30 min.

33. The aqueous slurry according to claim 1, wherein the aqueous slurry has an improved rheological stability under increased temperature for at least 1 h.

34. The aqueous slurry according to claim 1, wherein the aqueous slurry has an improved rheological stability under increased temperature for at least 12 h.

35. The aqueous slurry according to claim 1, wherein the aqueous slurry has an improved rheological stability under increased temperature for at least 24 h.

36. The aqueous slurry according to claim 1, wherein the aqueous slurry has an improved rheological stability under increased temperature for at least 1 week.

37. A method for producing an aqueous slurry with improved rheological stability under increased temperature comprising the steps of:
   a) providing a calcium carbonate containing material;
   b) providing water;
   c) providing at least one comb polymer, wherein the specific viscosity of the at least one comb polymer measured at 20° C. at a polymer concentration of 45 g/l differs from the specific viscosity of said polymer measured at 70° C. by a specific viscosity difference $\Delta\eta_{sp}$, wherein the absolute value of $\Delta\eta_{sp}$ is from 0.15 to 0.5, wherein the at least one comb polymer does not have a cloud point between 20° C. and 95° C. measured in water, and wherein the at least one comb polymer has a specific charge from −10 C/g to −600 C/g at pH 8;

d) mixing the calcium carbonate containing material of step a) with the water of step b); and e) mixing the at least one comb polymer of step c) with the calcium carbonate containing material before and/or during and/or after step d), wherein the at least one comb polymer is added in an amount, such that the viscosity of the aqueous slurry is between 25 and 1000 mPa·s measured at 20° C. and at 90° C.

38. The method according to claim 37, further comprising the additional step of heating the mixture of step d) and/or e) between 50° C. and 120° C., during and/or after step d) and/or e).

39. The method according to claim 38, wherein the mixture of step d) and/or e) is concentrated and/or ground during heating.

40. The method according to claim 37, wherein no dispersant is added to the aqueous slurry in step d).

41. Paper, plastic, paint, coating, concrete or agriculture product comprising or made with the aqueous slurry of claim 1.

42. A method for producing composite particles comprising the steps of:
a) providing a calcium carbonate containing material;
b) providing water;
c) providing at least one comb polymer;
  wherein the specific viscosity of the at least one comb polymer measured at 20° C. at a polymer concentration of 45 g/l differs from the specific viscosity of said polymer measured at 70° C. by a specific viscosity difference $\Delta\eta_{sp}$, wherein the absolute value of $\Delta\eta_{sp}$ is from 0.15 to 0.5,
  wherein the at least one comb polymer does not have a cloud point between 20° C. and 95° C. measured in water, and
  wherein the at least one comb polymer has a specific charge from −10 C/g to −600 C/g at pH 8;
d) mixing the calcium carbonate containing material of step a) with the water of step b);
e) mixing the at least one comb polymer of step c) with the calcium carbonate containing material before and/or during and/or after step d), wherein the at least one comb polymer is added in an amount, such that the viscosity of the aqueous slurry is between 25 and 1000 mPa·s measured at 20° C. and at 90° C.; and
f) drying the slurry obtained in step c) to obtain composite particles.

43. The composite particles obtained by the method according to claim 42.

44. Paper, plastic, paint, coating, concrete or agriculture product comprising or made with the composite particles of claim 43.

* * * * *